United States Patent
Zhang

(10) Patent No.: US 9,432,290 B2
(45) Date of Patent: Aug. 30, 2016

(54) PORT NEGOTIATION BETWEEN FCOE FORWARDERS

(71) Applicant: Hangzhou H3C Technologies Co., Ltd., Hangzhou (CN)

(72) Inventor: Changjun Zhang, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 14/373,583

(22) PCT Filed: Mar. 29, 2013

(86) PCT No.: PCT/CN2013/073430
§ 371 (c)(1),
(2) Date: Jul. 21, 2014

(87) PCT Pub. No.: WO2013/143487
PCT Pub. Date: Oct. 3, 2013

(65) Prior Publication Data
US 2015/0010013 A1 Jan. 8, 2015

(30) Foreign Application Priority Data
Mar. 29, 2012 (CN) .......................... 2012 1 0087618

(51) Int. Cl.
*H04L 12/741* (2013.01)
*H04L 29/08* (2006.01)
*H04L 12/46* (2006.01)
(Continued)

(52) U.S. Cl.
CPC ........... *H04L 45/74* (2013.01); *H04L 12/4641* (2013.01); *H04L 45/04* (2013.01); *H04L 49/3054* (2013.01); *H04L 67/1097* (2013.01)

(58) Field of Classification Search
CPC ... H04L 45/74; H04L 45/04; H04L 67/1097; H04L 12/4641
See application file for complete search history.

(56) References Cited

U.S. PATENT DOCUMENTS

| 2005/0080903 | A1 | 4/2005 | Valenci |
| 2009/0292813 | A1* | 11/2009 | Snively ............. H04L 29/12254 709/228 |

(Continued)

FOREIGN PATENT DOCUMENTS

| CN | 101577717 | 11/2009 |
| CN | 101588365 | 11/2009 |

(Continued)

OTHER PUBLICATIONS

International Search Report and Written Opinion dated Jul. 4, 2013 issued on PCT Patent Application No. PCT/CN2013/073430 dated Mar. 29, 2013, The State Intellectual Property Office, the P.R. China.

*Primary Examiner* — Albert T Chou
(74) *Attorney, Agent, or Firm* — Hewlett Packard Enterprise Patent Department

(57) ABSTRACT

According to an example, port negotiation between FCFs is implemented through initiation of a negotiation to an opposite party corresponding to a VFC port on a FCF within a VLAN corresponding to each VSAN supported by the VFC port on the FCF. The port negotiation also includes a determination of an intersection of the VSAN and the VLAN supported by the VFC port and the VSAN and the VLAN supported by the opposite party corresponding to the VFC port on the FCF and performance of an ELP negotiation within the intersection of the VSAN and the VLAN.

13 Claims, 2 Drawing Sheets

(51) Int. Cl.
*H04L 12/715* (2013.01)
*H04L 12/935* (2013.01)

(56) References Cited

U.S. PATENT DOCUMENTS

2011/0299539 A1* 12/2011 Rajagopal ........... H04L 12/4675
                                                    370/395.53
2012/0106957 A1*  5/2012 Willeke ............ H04L 29/12207
                                                    398/58
2012/0155469 A1*  6/2012 Majumdar .............. H04L 45/26
                                                    370/392
2012/0275467 A1* 11/2012 Xiong ................... H04L 49/357
                                                    370/419
2013/0148663 A1*  6/2013 Xiong ................... H04L 45/745
                                                    370/392

FOREIGN PATENT DOCUMENTS

| | | |
|---|---|---|
| CN | 101656721 | 2/2010 |
| CN | 102045248 | 5/2011 |
| CN | 102611952 | 7/2012 |
| WO | WO-2008021372 | 2/2008 |

* cited by examiner

PORT NEGOTIATION BETWEEN FCOE FORWARDERS

CLAIM FOR PRIORITY

The present application is a national stage filing under 35 U.S.C 371 of PCT application number PCT/CN2013/073430, having an international filing date of Mar. 29, 2013, which claims priority to China application No. 201210087618.7 having a filing date of Mar. 29, 2012, the disclosures of which are hereby incorporated by reference in their entireties.

BACKGROUND

Along with the development of Internet applications, ever increasing amounts of data are being generated. This increase in data generation has also resulted in increased requirements for storage, access, and backup of the generated data in storage that is high-capacity and highly reliable. Storage Area Networks (SANs) have been developed to provide suitable storage of the data.

Fabric Channel (FC) is one of the most widely used protocols in the SANs, i.e., data is transmitted based on FC networks in the SANs. In order to reduce the cost and difficulty in maintaining the FC network, Fiber Channel over Ethernet (FCoE) has been implemented. In FCoE, Local Area Networks (LAN), which implement Ethernet, and the SANs, which implement FC networks, have been integrated.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
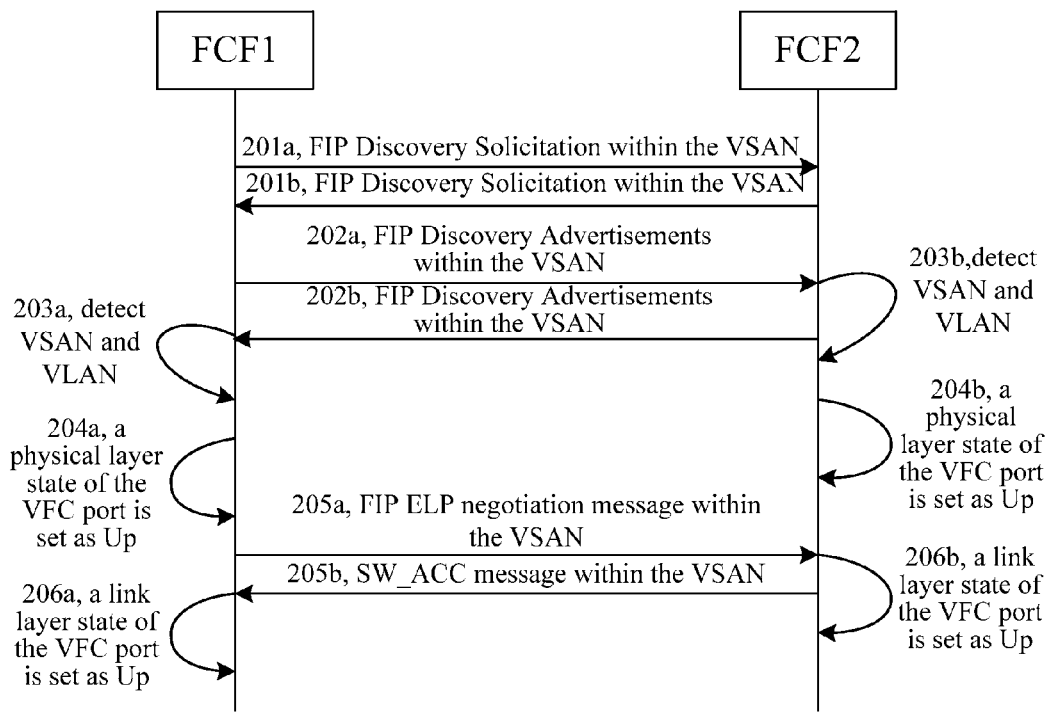
FIG. 1 is a flowchart illustrating a method for implementing port negotiation between FCFs in accordance with an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on.

In practical applications, in a Fibre Channel over Ethernet (FCoE) network, a Local Area Network (LAN), at the Ethernet level, is divided into multiple Virtual Local Area Networks (VLANs). In addition, a SAN, at the FC level, is divided into multiple Virtual Storage Area Networks (VLANs), in which each VSAN corresponds to one VLAN and covers a respective VLAN. In this way, port negotiation between Fiber Channel Forwarders (FCFs) in the FCoE network is related to negotiation of the VLAN and the VSAN.

Each of the FCFs has Ethernet ports in the Ethernet level and Virtual Fabric Channel (VFC) ports in the FC level. The Ethernet ports are used to form physical links between the FCFs in the Ethernet level. The VFC ports are over the Ethernet port and are used to form virtual links between the FCFs in the FC level. In examples of the present disclosure, the port negotiation between the FCFs mainly refers to negotiation of the VFC ports and is implemented based on various FCoE Initialization Protocol (FIP) protocols.

In conventional methods for implementing port negotiation between FCFs, the FCFs send FIP VLAN requests to each other to request a VLAN list including the VLANs of the VFC ports corresponding to the VFC ports of the opposite parties. The FCFs also send FIP VLAN notifications to each other, among other operations, which result in the port negotiation procedure containing redundancies and requiring a relatively long convergence time.

In examples of the present disclosure, transmission of the FIP VLAN request and the FIP VLAN notification may be omitted. Because the interaction of the FIP Discovery Solicitation and the FIP Discovery Advertisements is to detect the VLAN of the VFC ports on adjacent FCFs, by omitting transmission of the FIP VLAN request and the FIP VLAN notification, the VLAN supported by the VFC port on adjacent FCFs may also be obtained.

According to an example, the FIP Discovery Solicitation is sent from a VSAN supported by the FCF. Because each VSAN corresponds to one VLAN, the FIP Discovery Solicitation sent from the VSAN is substantively equivalent to the FIP Discovery Solicitation sent from the VLAN corresponding to the VSAN.

According to an example, the FIP Discovery Solicitation is transmitted via the VFC port of the adjacent FCFs to notify the VSAN supported by the VFC port and the VLAN corresponding to the VSAN. In this way, if it is determined that the VFC port of the adjacent FCF supports the same VSAN and this VSAN corresponds to the same VLAN, all of the Exchange Link Parameters (ELP) negotiation, Exchange Switch Capabilities (ESC) negotiation, and Exchange Virtual Fabrics Parameters (EVFP) negotiation in the VLAN are not necessary, and the ELP negotiation within the VSAN may be initiated directly.

FIG. 1 is a flowchart illustrating a method for implementing port negotiation between FCFs in accordance with an example of the present disclosure. As shown in FIG. 1, FCF1 and FCF2 are taken as example FCFs, and the method may include the following operations.

In block 201a, FCF1 may send a FIP Discovery Solicitation to a VFC port on FCF2 corresponding to a VFC port on FCF1 within a VLAN corresponding to each VSAN supported by the VFC port on FCF1. Block 201a may be implemented after the VFC port on FCF1 becomes usable.

Similarly, in block 201b, FCF2 may send a FIP Discovery Solicitation to a VFC port on FCF1 corresponding to a VFC port on FCF2 within a VLAN corresponding to each VSAN supported by the VFC port on FCF2. Block 201b may be implemented after the VFC port on FCF2 becomes usable. In blocks 201a and 201b, the FIP Discovery Solicitation sent within any VLAN carries a VLAN ID of the VLAN.

In block 202a, after the FIP Discovery Solicitation sent via the VFC port on FCF2 is received via the VFC port on FCF1, if FCF1 determines that the VFC port on FCF1 supports the VLAN of the FIP Discovery Solicitation, an indication may be made that the VLAN corresponding to the VSAN supported by the VFC on FCF2 is also supported by the VFC port on FCF1, and thus FCF1 may send FIP Discovery Advertisements to the VFC port on FCF2 corresponding to the VFC port on FCF1 within this VLAN. The FIP Discovery Advertisements may be used to notify the VFC port on FCF2 that the VFC port on FCF1 also supports this VLAN, and may also be used to notify the VFC port on FCF2 of the VSAN corresponding to the VLAN of the VFC port on FCF1.

Similarly, in block 202b, after the FIP Discovery Solicitation sent via the VFC port on FCF1 is received via the VFC port on FCF2, if FCF2 determines that the VFC port on FCF2 supports the VLAN of the FIP Discovery Solicitation, an indication may be made that the VLAN corresponding to the VSAN supported by the VFC on FCF1 is also supported by the VFC port on FCF2, and thus FCF2 may send FIP Discovery Advertisement to the VFC port on FCF1 corresponding to the VFC port on FCF2 within this VLAN. The FIP Discovery Advertisements may be used to notify the VFC port on FCF1 that the VFC port on FCF2 also supports this VLAN, and may also be used to notify the VFC port on FCF1 of the VSAN corresponding to the VLAN of the VFC port on FCF2. In blocks 202a and 202b, the FIP Discovery Advertisements sent within any VLAN carries a VLAN ID of the VLAN and a VSAN ID of the VSAN to be notified by the FIP Discovery Advertisements.

According to an example, block 202a may be performed before or after block 201b, may be performed before or after block 202b, or may be performed when block 201b or block 202b is performed. Similarly, block 202b may be performed before or after block 201a, may be performed before or after block 202a, or may be performed when block 201a or block 202a is performed.

In block 203a, after the FIP Discovery Advertisements sent via the VFC port on FCF2 are received via the VFC port on FCF1, FCF1 may detect whether the VFC port on FCF1 supports the VSAN notified by the FIP Discovery Advertisements and whether the VSAN also corresponds to the VLAN of the FIP Discovery Advertisements on the VFC port of FCF1.

Similarly, in block 203b, after the FIP Discovery Advertisements sent via the VFC port on FCF1 are received via the VFC port on FCF2, FCF2 may detect whether the VFC port on FCF2 supports the VSAN notified by the FIP Discovery Advertisements and whether the VSAN also corresponds to the VLAN of the FIP Discovery Advertisements on the VFC port of FCF2.

In block 204a, if FCF1 determines that the VFC port on FCF1 supports the VSAN notified by the FIP Discovery Advertisements and the VSAN also corresponds to the VLAN of the FIP Discovery Advertisements on the VFC port of FCF1, an indication may be made that the VFC port on FCF1 and the VFC port on FCF2 support the same VSAN, and this VSAN corresponds to the same VLAN. If the FIP Discovery Solicitation sent via the VFC port on FCF2 has already been received via the VFC port on FCF1, FCF1 may set a physical layer state of the VFC port on FCF1 in this VSAN as Up.

Similarly, in block 204b, if FCF2 determines that the VFC port on FCF2 supports the VSAN notified by the FIP Discovery Advertisements and the VSAN also corresponds to the VLAN of the FIP Discovery Advertisements on the VFC port of FCF2, an indication may be made that the VFC port on FCF2 and the VFC port on FCF1 support the same VSAN, and this VSAN corresponds to the same VLAN. If the FIP Discovery Solicitation sent via the VFC port on FCF2 has already been received via the VFC port on FCF1, FCF2 may set a physical layer state of the VFC port on FCF2 in this VSAN as Up.

In block 205a, after the physical layer state of the VFC port on FCF1 is set as Up within any VSAN, FCF1 may perform ELP negotiation with the VFC port on FCF2 corresponding to the VFC port on FCF1 within this VSAN.

Similarly, in block 205b, after the physical layer state of the VFC port on FCF2 is set as Up within any VSAN, FCF2 may perform ELP negotiation with the VFC port on FCF1 corresponding to the VFC port on FCF2 within this VSAN.

In the ELP negotiation procedure within any VSAN in the above blocks 205a and 205b, the VFC port on FCF1 may be the initiating end and the VFC port on FCF2 may be the response end, and the ELP negotiation has succeeded.

In block 205a, FCF1 may send a FIP ELP negotiation message to the VFC port on FCF2 corresponding to the VFC port on FCF1 within this VSAN, and may wait for a Switch Fabric Acceptance (SW_ACC) message or a Switch Fabric Rejection (SW_RJT) message sent by the VFC port on FCF2 within the VSAN.

In block 205b, FCF2 may wait for the FIP ELP negotiation message sent by the VFC port on FCF1 corresponding to the VFC port on FCF2 within this VSAN. After receiving the FIP ELP negotiation message, if the ELP negotiation succeeds, FCF2 may send the SW_ACC message to the VFC port on FCF1 corresponding to the VFC port on FCF2 within the VSAN. However, if the ELP negotiation does not succeed, FCF2 may send the SW_RJT message to the VFC port on FCF1 corresponding to the VFC port on FCF2 within the VSAN.

The initiating end and the response end may be determined through suitable conventional manners and are thus not described herein.

In addition, the FIP ELP negotiation message, the SW_ACC message and the SW_RJT message in the above ELP negotiation procedure within any VSAN may carry the VSAN ID of the VSAN.

In step 206a, after the ELP negotiation of the VFC port on FCF1 within any VSAN succeeds, a link layer state of the VFC port on FCF1 within the VSAN may be set as Up.

Similarly, in step 206b, after the ELP negotiation of the VFC port on FCF2 within any VSAN succeeds, a link layer state of the VFC port on FCF2 within the VSAN may be set as Up.

According to an example, through use of the method for implementing port negotiation between FCFs provided by examples of the present disclosure, the interaction procedure related to the FIP VLAN request message and the FIP VLAN notification message, the ELP negotiation, the ESC negotiation, and the EVFP negotiation are omitted from the port negotiation between the FCFs, thereby simplifying the port negotiation between FCFs.

Figure 2:
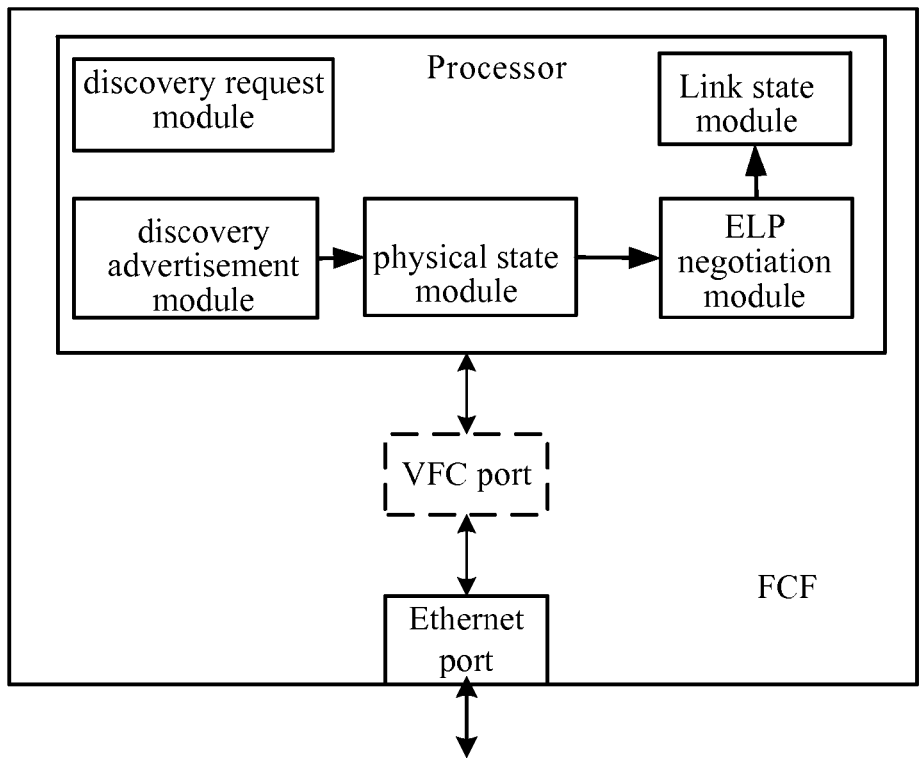
FIG. 2 is a schematic diagram illustrating an apparatus for implementing port negotiation between FCFs in accordance with an example of the present disclosure

Also disclosed herein is an apparatus for implementing port negotiation between FCFs. As shown in FIG. 2, the apparatus includes a processor and an Ethernet port. The processor includes a discovery request module, a discovery advertisement module, a physical state module, an ELP negotiation module, and a link state module. In some examples the modules may implemented as hardware circuitry or logic or the processor and in other examples the modules be stored in a machine readable memory and executable by the processor.

The discovery request module is to send a FIP Discovery Solicitation to a

VFC port on an opposite party corresponding to a VFC port on the FCF within a VLAN corresponding to each VSAN supported by the VFC port on the FCF. The discovery request module may send the FIP Discovery Solicitation after the VFC port on the FCF is determined to be usable. The VFC port on the FCF is over the Ethernet port. The FIP Discovery Solicitation sent within any VLAN carries a VLAN ID of the VLAN.

The discovery advertisement module is to, after the FIP Discovery Solicitation sent by the opposite party is received via the VFC port on the FCF, if it is determined that the VFC port on the FCF supports the VLAN of the FIP Discovery Solicitation, send FIP Discovery Advertisement to the opposite party corresponding to the VFC port on the FCF within the VLAN. The FIP Discovery Advertisements sent within any VLAN carries a VLAN ID of the VLAN and a VSAN ID of the VSAN to be notified by the FIP Discovery Advertisements.

The physical state module is to, after the FIP Discovery Advertisements sent by the opposite party are received via the VFC port on the FCF, if it is determined that the VFC port on the FCF supports the VSAN notified by the FIP Discovery Advertisements and the VSAN corresponds to the VLAN of the FIP Discovery Advertisements on the VFC port of FCF, and if the FIP Discovery Solicitation sent by the opposite party has already been received via the VFC port on the FCF, set a physical layer state of the VFC port on the FCF within the VSAN as Up.

The ELP negotiation module is to, after the physical layer state of the VFC port on the FCF is set as Up within any VSAN, perform ELP negotiation with the opposite party corresponding to the VFC port on FCF within the VSAN. For the ELP negotiation within any VSAN, if the VFC port on the FCF is the initiating end, the ELP negotiation module is to send a FIP ELP negotiation message to the opposite party corresponding to the VFC port on the FCF within the VSAN, and wait for a SW_ACC message or a SW_RJT message sent by the opposite party within the VSAN.

If the VFC port on the FCF is the response end, the ELP negotiation module is to wait for the FIP ELP negotiation message sent by the opposite party corresponding to the VFC port on the FCF within the VSAN. After receiving the FIP ELP negotiation message, the ELP negotiation module is to send a SW_ACC message to the opposite party corresponding to the VFC port on the FCF within the VSAN if the ELP negotiation succeeds or to send a SW_RJT message to the opposite party corresponding to the VFC port on FCF within the VSAN if the ELP negotiation does not succeed.

In addition, the FIP ELP negotiation message, the SW_ACC message and the SW_RJT message sent within any VSAN carry the VSAN ID of the VSAN.

The link state module is to, after the ELP negotiation of the VFC port on the FCF within the VSAN succeeds, set a link layer state of the VFC port on the FCF within the VSAN as Up.

Figure 3:
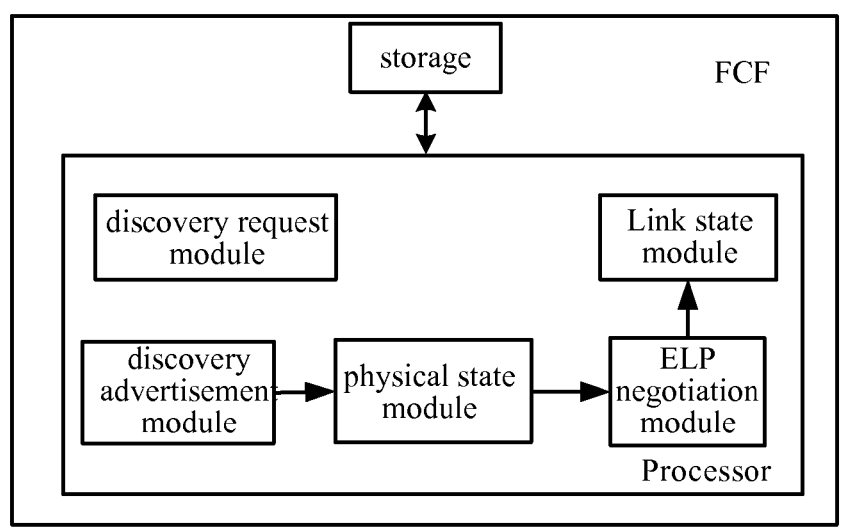
FIG. 3 is a schematic diagram illustrating a hardware structure applicable for a method and apparatus for implementing port negotiation between FCFs in accordance with an example of the present disclosure.

FIG. 3 is a schematic diagram illustrating a hardware structure applicable for a method and apparatus for implementing port negotiation between FCFs in accordance with an example of the present disclosure. As shown in FIG. 3, the hardware structure includes a processor and storage. It is also possible to implement the method and apparatus by machine readable instructions stored in memory and executable by a processor.

In both cases, the processor is to, send a FCoE Initialization Protocol (FIP) Discovery Solicitation to an opposite party corresponding to a VFC port on a FCF within a VLAN corresponding to each VSAN supported by the VFC port on the FCF; after FIP Discovery Advertisements sent by the opposite party are received by the VFC port on the FCF, if it is determined that the VFC port on the FCF supports the VSAN notified by the FIP Discovery Advertisements and the VFC port on the FCF corresponding to the VSAN corresponds to the VLAN of the FIP Discovery Advertisements, and if the FIP Discovery Solicitation sent by the opposite party has already been received via the VFC port on the FCF, set a physical layer state of the VFC port on the FCF within the VSAN as Up; after the physical layer state of the VFC port on the FCF within the VSAN is set as Up, perform ELP negotiation with the opposite party corresponding to the VFC port on the FCF within the VSAN; after the ELP negotiation of the VFC port on the FCF within the VSAN succeeds, set a link layer state of the VFC port on the FCF within the VSAN as Up.

The storage is to record information indicating that the VFC port on the FCF support the VSAN notified by the FIP Discovery Advertisements and information indicating that the VSAN of the VFC port on the FCE corresponds to the VLAN of the FIP Discovery Advertisements.

The apparatus may be a network switch and the modules may be hardware and/or software modules. In instances in which the modules are hardware modules, the hardware modules may be implemented mechanically or electronically. For example, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations.

The methods and apparatuses provided herein may be implemented by hardware, machine-readable instructions or a combination of hardware and machine-readable instructions. Machine-readable instructions used in the examples disclosed herein may be stored in storage medium readable by multiple processors, such as hard drive, CD-ROM, DVD, compact disk, floppy disk, magnetic tape drive, RAM, ROM or other proper storage device. Or, at least part of the machine-readable instructions may be substituted by specific-purpose hardware, such as custom integrated circuits, gate array, FPGA, PLD, and specific-purpose computers and so on.

A machine-readable storage medium may also be provided, which is to store instructions to cause a machine to execute a method as described herein. Specifically, a system or apparatus having a storage medium that stores machine-readable program codes for implementing functions of any of the above examples and which may make the system or the apparatus (or CPU or MPU) read and execute the program codes stored in the storage medium. In this example, the program codes read from the storage medium may implement any one of the above examples. The storage medium may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

What has been described and illustrated herein is an example of the disclosure along with some of its variations. The terms, descriptions and figures used herein are set forth by way of illustration only and are not meant as limitations.

Many variations are possible within the spirit and scope of the disclosure, which is intended to be defined by the following claims—and their equivalents—in which all terms are meant in their broadest reasonable sense unless otherwise indicated.

The invention claimed is:

1. A method for implementing port negotiation between Fibre Channel over Ethernet (FCoE) Forwarders (FCFs), comprising:
    sending, by a first FCF which includes a first Virtual Fiber Channel (VFC) port, a FCoE Initialization Protocol (FIP) Discovery Solicitation to a second VFC port on a second FCF, wherein the sending is within a Virtual Local Area Network (VLAN) corresponding to a Virtual Storage Area Network (VSAN) supported by the first VFC port and wherein the FIP Discovery Solicitation includes a VLAN ID of said VLAN;
    receiving, by the first VFC, a FIP Discovery Advertisement sent by the second FCF, wherein the FIP Discovery Advertisement includes a VSAN ID of a VSAN supported by the second VFC and a VLAN ID of a VLAN associated with the VSAN supported by the second VFC;
    determining, by the first FCF, an intersection of the VSAN and the VLAN supported by the first VFC port with the VSAN and the VLAN supported by the second VFC port; and
    performing, by the FCF, an Exchange Link Parameter (ELP) negotiation within the intersection of the VSAN and the VLAN.

2. The method of claim 1,
    wherein the determining, by the first FCF, an intersection of the VSAN and the VLAN supported by the first VFC port with the VSAN and the VLAN supported by the second VFC port comprises:
    after FIP Discovery Advertisements sent by the opposite party are received by the VFC port on the FCF, if it is determined that the VFC port on the FCF supports the VSAN notified by the FIP Discovery Advertisements and the VFC port on the FCF corresponding to the VSAN corresponds to the VLAN of the FIP Discovery Advertisements, and if the FIP Discovery Solicitation sent by the opposite party has already been received via the VFC port on the FCF, setting a physical layer state of the VFC port on the FCF within the VSAN as Up; wherein the VSAN notified by the FIP Discovery Advertisements is the VSAN corresponding to the VLAN of the opposite party;
    performing, by the FCF, an ELP negotiation within the intersection of the VSAN and the VLAN comprises:
    after setting the physical layer state of the first VFC port within the VSAN as Up, performing, by the first FCF, ELP negotiation with the second VFC port within the VSAN; and
    after the ELP negotiation of the first VFC port within the VSAN succeeds, setting, by the first FCF, a link layer state of the first VFC port within the VSAN as Up.

3. The method of claim 1, wherein the FCoE is divided into a plurality of VLANs.

4. The method of claim 3, wherein the first VFC port supports a plurality of VSANs and the sending includes sending a respective FIP Discovery Solicitation for each VSAN supported by the VFC port, each respective FIP Discovery Solicitation being sent on a VLAN corresponding to the respective VSAN.

5. The method of claim 1, wherein the ELP negotiation within the VSAN comprises:
    if the first VFC port is an initiating end of the ELP negotiation, sending a FIP ELP negotiation message to the opposite party corresponding to the second VFC port within the VSAN, and waiting for a Switch Fabric Acceptance (SW_ACC) message or a Switch Fabric Rejection (SW_RJT) message sent by the opposite party within the VSAN; and
    if the first VFC port is a response end of the ELP negotiation, waiting for a FIP ELP negotiation message sent by the opposite party corresponding to the second VFC port within the VSAN; after receiving the FIP ELP negotiation message, if the ELP negotiation succeeds, sending a SW_ACC message to the opposite party corresponding to the first VFC port within the VSAN; if the ELP negotiation does not succeed, sending a SW_RJT message to the opposite party corresponding to the first VFC port within the VSAN.

6. The method of claim 5, wherein each of the FIP ELP negotiation message, the SW_ACC message and the SW_RJT message sent within the VSAN carries the VSAN ID of the VSAN.

7. A Fibre Channel over Ethernet (FCoE) forwarder (FCF), comprising:
    an Ethernet port and a Virtual Fiber Channel (VFC) port associated with the Ethernet port;
    a processor, to initiate a negotiation to an opposite party corresponding to the VFC port within a Virtual Local Area Network (VLAN) corresponding to each Virtual Storage Area Network (VSAN) supported by the VFC port; to determine an intersection of the VSAN and VLAN supported by the VFC port and the VSAN and VLAN supported by an opposite party of the VFC port, to perform an Exchange Link Parameter (ELP) negotiation within the intersection of the VSAN and the VLAN, and to record information of the VSAN supported by the VFC port and information of the VLAN corresponding to the VSAN on the VFC port;
    wherein the negotiation includes sending a FCoE Initialization Protocol (FIP) Discovery Solicitation to the opposite party without first sending a FIP VLAN Request packet and receiving a FIP VLAN notification from the opposite party; wherein the FIP Discovery Solicitation indicates a VLAN corresponding to a VSAN supported by the VFC port of the FCF.

8. The Fiber Channel over Ethernet Forwarder of claim 7, wherein
    the processor is to, send a FCoE Initialization Protocol (FIP) Discovery Solicitation to the opposite party of the VFC port within the VLAN corresponding to each VSAN supported by the VFC port and to receive a FIP Discovery Advertisements sent by the opposite party;
    after the FIP Discovery Advertisement sent by the opposite party is received by the VFC port, if it is determined that the VFC port supports the VSAN notified by the FIP Discovery Advertisement and the VSAN on the VFC port corresponds to the VLAN notified by the FIP Discovery Advertisement, and if the FIP Discovery Solicitation sent by the opposite party has already been received via the VFC port, set a physical layer state of the VFC port within the VSAN as Up; the VSAN notified by the FIP Discovery Advertisement is determined to be the VSAN corresponding to the VLAN of the opposite party;

after the physical layer state of the VFC port is set as Up within the VSAN, perform ELP negotiation with the opposite party corresponding to the VFC port within the VSAN; and after the ELP negotiation of the VFC port within the VSAN succeeds, set a link layer state of the VFC port within the VSAN as Up.

9. The apparatus of claim 8, wherein each of the FIP Discovery Solicitation and the FIP Discovery Advertisement sent within the VLAN carry a VLAN ID of the VLAN.

10. The apparatus of claim 9, wherein the FIP Discovery Advertisement further carries a VSAN ID of the VSAN notified by the FIP Discovery Advertisement.

11. The Fiber Channel over Ethernet Forwarder of claim 7, wherein the ELP negotiation within the VSAN comprises:

if the VFC port is an initiating end of the ELP negotiation, the processor is to send a FIP ELP negotiation message to the opposite party corresponding to the VFC port within the VSAN, and wait for a Switch Fabric Acceptance (SW_ACC) message or a Switch Fabric Rejection (SW_RJT) message sent by the opposite party within the VSAN;

if the VFC port is the response end of the ELP negotiation, the processor is to wait for a FIP ELP negotiation message sent by the opposite party corresponding to the VFC port within the VSAN; after receiving the FIP ELP negotiation message, if the ELP negotiation succeeds, send a SW_ACC message to the opposite party corresponding to the VFC port within the VSAN; if the ELP negotiation does not succeed, send a SW_RJT message to the opposite party corresponding to the VFC port within the VSAN.

12. The Fiber Channel over Ethernet Forwarder of claim 11, wherein each of the FIP ELP negotiation message, the SW_ACC message, and the SW_RJT message sent within the VSAN carries the VSAN ID of the VSAN.

13. An apparatus for implementing port negotiation between Fibre Channel over Ethernet (FCoE) forwarders (FCFs), comprising:

a processor to, send a FCoE Initialization Protocol (FIP) Discovery Solicitation to an opposite party corresponding to a VFC port on a FCF within a VLAN corresponding to each VSAN supported by the VFC port on the FCF;

after FIP Discovery Advertisements sent by the opposite party are received by the VFC port on the FCF, if it is determined that the VFC port on the FCF supports the VSAN notified by the FIP Discovery Advertisements and the VFC port on the FCF corresponding to the VSAN corresponds to the VLAN of the FIP Discovery Advertisements, and if the FIP Discovery Solicitation sent by the opposite party has already been received via the VFC port on the FCF, set a physical layer state of the VFC port on the FCF within the VSAN as Up;

after the physical layer state of the VFC port on the FCF within the VSAN is set as Up, perform ELP negotiation with the opposite party corresponding to the VFC port on the FCF within the VSAN;

after the ELP negotiation of the VFC port on the FCF within the VSAN succeeds, set a link layer state of the VFC port on the FCF within the VSAN as Up; and a storage to record information indicating that the VFC port on the FCF support the VSAN notified by the FIP Discovery Advertisements and information indicating that the VSAN of the VFC port on the FCE corresponds to the VLAN of the FIP Discovery Advertisements.

* * * * *